UNITED STATES PATENT OFFICE.

HIRAM G. HICKS, OF WORCESTER, MASSACHUSETTS.

WELDING COMPOUND.

SPECIFICATION forming part of Letters Patent No. 407,659, dated July 23, 1889.

Application filed December 6, 1888. Serial No. 292,810. (No specimens.)

*To all whom it may concern:*

Be it known that I, HIRAM G. HICKS, a citizen of the United States, residing at Worcester, in the county of Worcester and State of Massachusetts, have invented new and useful Improvements in Welding Compounds, of which the following is a specification.

The object of my present invention is to provide a practical compound of superior efficiency for the convenient use of blacksmiths and other metal-workers for the purposes of welding, toughening, and refining steel, and correcting and restoring to proper condition the quality and life of steel which has been burned or overheated; also, to provide a compound or composition of matter for the purposes stated, which will not deteriorate and become practically useless by standing for a considerable length of time or under the ordinary conditions of exposure. These objects I attain by a composition formed of ingredients combined as hereinafter described and claimed.

For producing my improved welding compound, I employ the following-named substances as ingredients, which I prefer to combine in the proportions specified, although some variation of proportion may be permitted without materially changing the nature thereof, viz: Borax, sixteen parts, by weight; sal-ammoniac, one part; carbonate of iron, one part, and plaster-of-paris four parts.

In making my compound the borax is first heated in an open pan or vessel over a slow fire, to drive off a considerable portion of the water of crystallization. Then add the sal-ammoniac, together with the carbonate of iron and the plaster-of-paris, and mix the mass thoroughly and expose it to a gentle heat until it is properly dry. It is then cooled, and comminuted or pulverized by grinding to a fine powdered form, in which condition it is put up in packages ready for market and use.

When used, the powdered compound is sprinkled upon the surface of the steel to be welded or forged, the metal having been previously heated to a red heat in a manner similar to the processes heretofore employed.

My compound is also very useful for the purpose of welding cast-steel, and also for correcting or restoring to proper condition steel that has been overheated or burned, and for giving renewed life and quality to drills, stone-dressing tools, and similar tools that have been injured in heating and tempering.

It must be remarked that the compound above described differs from the compound described in Letters Patent No. 355,395, granted to me January 4, 1887, by substituting for the black manganese contained in the last-named compound a quantity of plaster-of-paris, and I have found that by this substitution the welding properties of the compound are materially improved.

What I claim as new, and desire to secure by Letters Patent, is—

1. A compound for the purposes of welding, toughening, and refining steel, consisting of borax, sal-ammoniac, carbonate of iron, and plaster-of-paris, in combination, substantially as hereinbefore set forth.

2. A compound for use in welding, refining, or treating steel, composed of borax, sal-ammoniac, carbonate of iron, and plaster-of-paris, combined in the proportions substantially as specified, and prepared in the manner substantially as described.

In testimony whereof I have hereunto set my hand and seal in the presence of two subscribing witnesses.

HIRAM G. HICKS. [L. S.]

Witnesses:
 W. C. HAUFF,
 E. F. KASTENHUBER.